(12) United States Patent
Ito

(10) Patent No.: US 8,903,170 B2
(45) Date of Patent: Dec. 2, 2014

(54) IMAGE PROCESSING APPARATUS, IMAGE PROCESSING METHOD, AND NON-TRANSITORY COMPUTER READABLE MEDIUM

(71) Applicant: Fuji Xerox Co., Ltd., Tokyo (JP)

(72) Inventor: Atsushi Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 143 days.

(21) Appl. No.: 13/745,252

(22) Filed: Jan. 18, 2013

(65) Prior Publication Data

US 2014/0044350 A1 Feb. 13, 2014

(30) Foreign Application Priority Data

Aug. 8, 2012 (JP) .................................. 2012-176246

(51) Int. Cl.
 *G06K 9/34* (2006.01)
 *G06K 9/46* (2006.01)
(52) U.S. Cl.
 CPC ................ *G06K 9/4652* (2013.01); *G06K 9/46* (2013.01)

USPC .......................................................... 382/164
(58) Field of Classification Search
 None
 See application file for complete search history.

(56) References Cited

U.S. PATENT DOCUMENTS

2008/0120674 A1* 5/2008 Suzuki ........................ 725/118

FOREIGN PATENT DOCUMENTS

JP 10-145623 A 5/1998
JP 10-243221 A 9/1998

* cited by examiner

*Primary Examiner* — Brian P Werner
*Assistant Examiner* — Feng Niu
(74) *Attorney, Agent, or Firm* — Sughrue Mion, PLLC

(57) ABSTRACT

An image processing apparatus includes an extraction unit and a calculation unit. The extraction unit extracts a local color displacement that is a local displacement of color in a region of interest in a given image. The calculation unit calculates a similarity between the local color displacement and an extracted-color displacement that is a displacement of a preset color.

20 Claims, 14 Drawing Sheets

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-176246 filed Aug. 8, 2012.

BACKGROUND (i) Technical Field

The present invention relates to an image processing apparatus, an image processing method, and a non-transitory computer readable medium.

(ii) Related Art

In recent years, technologies have been developed and utilized for outputting an image having electronic information added thereto in a manner unrecognizable to the human eye and detecting the presence of the added information or extracting the added information when reading the image by using a reader.

SUMMARY

According to an aspect of the invention, there is provided an image processing apparatus including an extraction unit and a calculation unit. The extraction unit extracts a local color displacement that is a local displacement of color in a region of interest in a given image. The calculation unit calculates a similarity between the local color displacement and an extracted-color displacement that is a displacement of a preset color.

BRIEF DESCRIPTION OF THE DRAWINGS

Exemplary embodiments of the present invention will be described in detail based on the following figures, wherein.

DETAILED DESCRIPTION

Figure 2A:
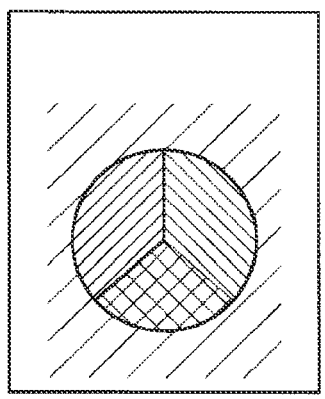
FIGS. 2A to 2C illustrate an example of the embedding of information.
Figure 2B:
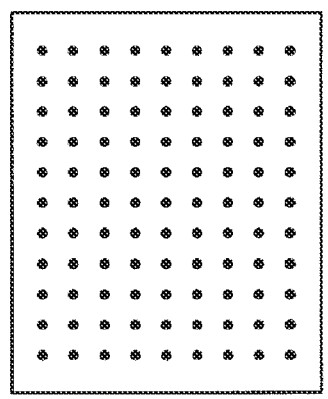
Figure 2C:
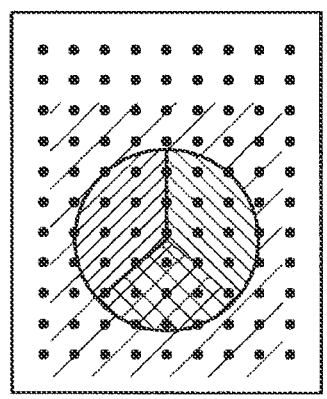
Figure 3:
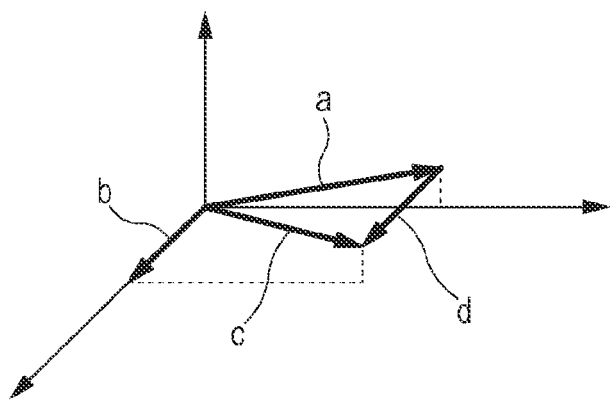
FIG. 3 illustrates a change in color when information is embedded.

First, an image having information embedded therein, which is used in exemplary embodiments of the present invention, will be described. FIGS. 2A to 2C illustrate an example of the embedding of information, and FIG. 3 illustrates a change in color when information is embedded. FIG. 2A illustrates an example of an original image, and FIG. 2B illustrates an example of an image of information to be embedded. In the example of the original image illustrated in FIG. 2A, different colors are represented by different hatching patterns. The original image is not limited to any particular image. Further, information may be embedded into the original image by embedding dots of a predetermined color. In the image of the information to be embedded illustrated in FIG. 2B, dots of a predetermined color are represented as black dots. The pattern to be used for embedding is not limited to a dot pattern, and the size, shape, and location of the pattern may be determined in advance and are not limited to those in the illustrated example. The pattern with which information is embedded, including the color thereof, may be set so as to be unrecognizable to most people at their first glance.

Information may be embedded into the original image by combining the information and the original image. For example, the image of the information illustrated in FIG. 2B may be combined with the image illustrated in FIG. 2A to obtain an image illustrated in FIG. 2C. The image illustrated in FIG. 2C is output. Thus, an image having information embedded therein is output.

FIG. 3 illustrates a specific example of a change in the color of a pixel in which information is embedded. A color a is the color of the corresponding pixel in the original image, and a color b is a color to be embedded. The color a of the pixel is changed to a color c by embedding information into the original image. Such a pixel whose color has been changed may be included in a combined image. Setting the color, size, and the like to be embedded so that they are not visually recognizable in the manner described above allows the visible color of the original image to be retained unchanged.

The color displacement in the pixel will now be focused on. The color a is changed to the color c by a displacement d. The displacement d is a displacement of the embedded color b from white. Thus, if the color with which information has been embedded is given as a displacement and a region of the color a includes a pixel of the color c, a displacement between the color a and the color c may be compared with the given displacement to determine whether or not the pixel is a pixel in which information has been embedded.

The following exemplary embodiments of the present invention are based on the findings described above. Any image may be given. If an image having information embedded therein, such as the image illustrated in FIG. 2C, is given, it is detected that the image has information embedded therein, or a process for acquiring the embedded information is performed.

Figure 1:
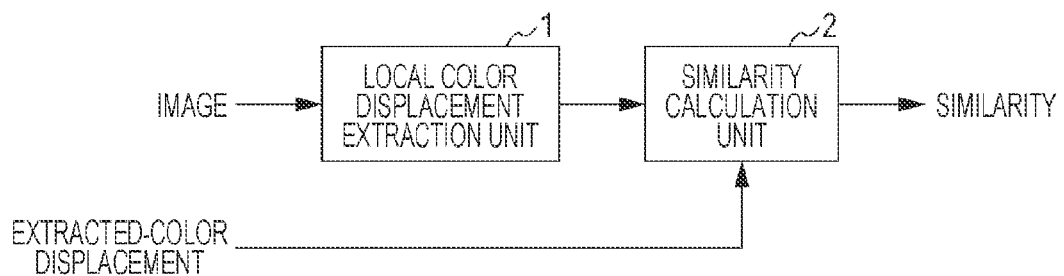
FIG. 1 illustrates a first exemplary embodiment of the present invention.

FIG. 1 is a block diagram illustrating a first exemplary embodiment of the present invention. A local color displacement extraction unit 1 extracts a local color displacement. The local color displacement is a local color displacement occurring in a region of interest in a given image. The region of interest includes one or plural pixels. The given image is processed while changing the region of interest over the whole or part of the given image. The local color displacement may be obtained by, for example, calculating a color displacement from a local average color in the region of interest. The local average color may be obtained by calculating an average of colors of all or some pixels in a region (local region) with a predetermined size and shape including the region of interest. Further, a color displacement may also be determined as a color difference vector. The color difference vector may be determined using a color vector in the region of interest in the color space and a color vector of the local average color. Alternatively, a difference for each component representing a color may be determined, and a vector whose elements are the respective differences may be used as a color difference vector. Alternatively, local derivative values may be determined from color values of the image, or a local derivative value may be determined for each color component, and the local color displacement may be determined using such derivative values.

A similarity calculation unit 2 calculates a similarity between the local color displacement extracted by the local color displacement extraction unit 1 and an extracted-color displacement. The extracted-color displacement is a displacement of a preset color. In this example, the extracted-color displacement may be a vector of a color with which given information has been embedded or a vector determined from the local derivative values of the color. As an example of the similarity to be calculated, when the extracted-color displacement is represented by a vector $V_y$, the local color displacement is represented by a vector V, and the angle defined by the vectors $V_y$ and V is represented by α, a similarity $F_y$ may be determined by $$F_y = |V|^m (\cos(\alpha))^n,$$

where m and n are constants. The smaller the angle defined between the vectors $V_y$ and V, the larger the value the similarity $F_y$ takes. Theoretically, if information has been embedded, the local color displacement will be the extracted-color displacement. Thus, the larger the value the similarity $F_y$ has, the more probable it is that information may be embedded in the region of interest.

The above-described similarity calculation method is merely an example, and any other method may be used to determine a similarity. Alternatively, when a similarity is determined, the similarity in an opposite direction between the vector of the extracted-color displacement and the vector of the local color displacement may also be determined, and one of the similarities in both directions may be selected in order to deal with the case where information is embedded with inversion (or subtraction) when embedded.

Figure 4:
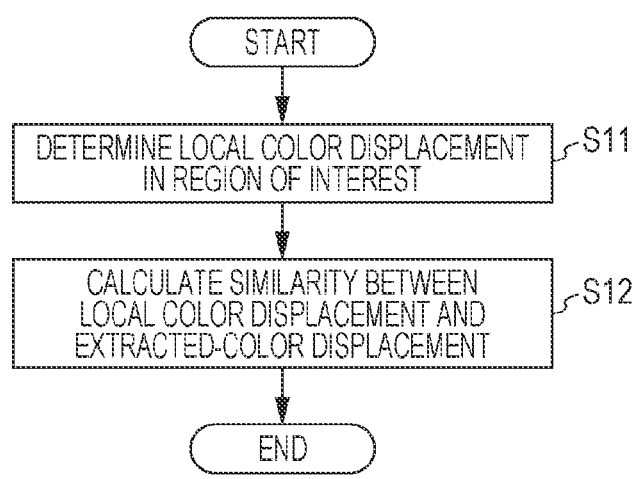
FIG. 4 is a flowchart illustrating an example of an operation according to the first exemplary embodiment of the present invention.

FIG. 4 is a flowchart illustrating an example of an operation according to the first exemplary embodiment of the present invention. In S11, the local color displacement extraction unit 1 determines a local color displacement from a local color displacement of a in a region of interest, such as a color difference vector between a local average value and a color in the region of interest or a local derivative value.

In S12, the similarity calculation unit 2 calculates a similarity between the local color displacement determined by the local color displacement extraction unit 1 and a preset extracted-color displacement.

The similarity calculated by the similarity calculation unit 2 is output as a value of the region of interest. If a region of interest exists for which the similarity calculated by the similarity calculation unit 2 is greater than or equal to a preset threshold, it may be determined that the given image includes embedded information. Alternatively, a similarity image in which a value of similarity is assigned to each region of interest may be generated. In the similarity image, a larger value of similarity is assigned to a region where information is embedded and, for example, as in the image illustrated in FIG. 2B, the image of the information to be embedded is reproduced. Once the position or shape of a portion of the image where a locally maximum value is obtained is specified, the position at which the information has been embedded may be determined, leading to the acquisition of the information.

Accordingly, the presence or absence of information may be determined and the information may be acquired using a similarity. Thus, information embedded in a portion other than a white margin may also be detected and acquired. Furthermore, if variations in color have occurred due to various factors, the use of a value of similarity may ensure that information is detected and acquired.

Figure 5:
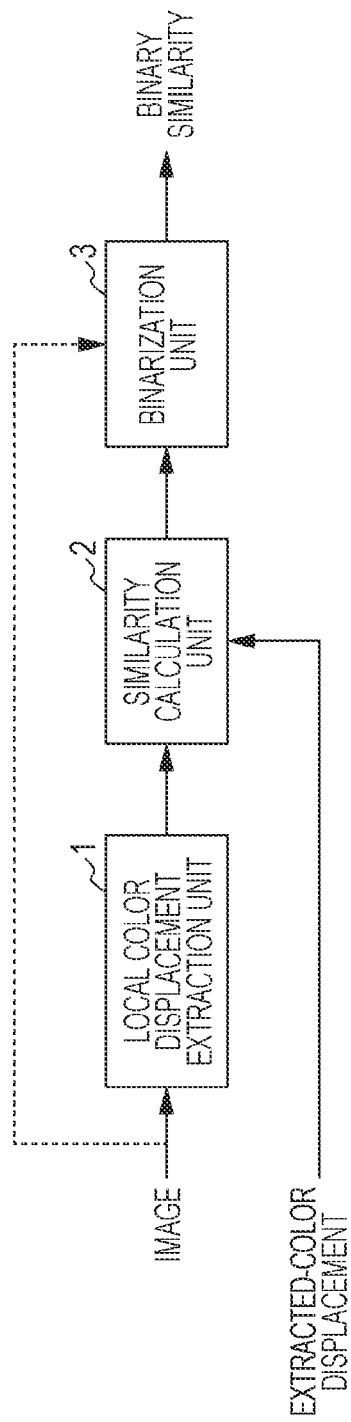
FIG. 5 is a block diagram illustrating a first exemplary modification of the first exemplary embodiment of the present invention.

FIG. 5 is a block diagram illustrating a first exemplary modification of the first exemplary embodiment of the present invention. In the first exemplary modification, a binarization unit 3 is provided in addition to the configuration illustrated in FIG. 1.

The binarization unit 3 binarizes a region of interest on the basis of the similarity calculated by the similarity calculation unit 2. The binarization unit 3 may binarize a region of interest by comparing the similarity calculated by the similarity calculation unit 2 with a preset threshold. A region whose value of similarity is greater than or equal to the threshold may appear in a binary image. Alternatively, the binarization unit 3 may perform enhancement processing on a given image based on a similarity, and may binarize the image subjected to the enhancement processing. For example, the larger the value the similarity has, the greater the effect the enhancement has. Thus, a region where information is embedded may be enhanced, and the enhanced portion is subjected to binarization processing and is developed in a binary image.

As described above, the degree to which information is embedded may be determined using a similarity image generated based on a value of similarity output from the similarity calculation unit 2. With the use of a binary image, moreover, a region where information is embedded may be explicitly identified.

Figure 6:
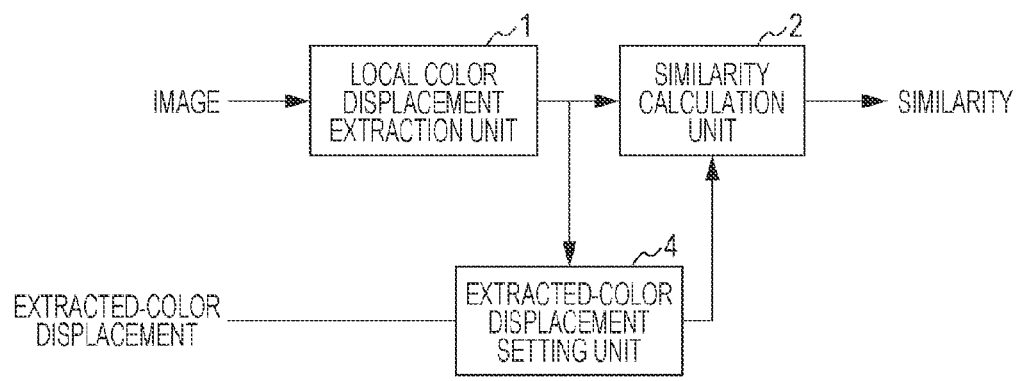
FIG. 6 is a block diagram illustrating a second exemplary modification of the first exemplary embodiment of the present invention.

FIG. 6 is a block diagram illustrating a second exemplary modification of the first exemplary embodiment of the present invention. In the second exemplary modification, a vector of a color with which given information has been embedded or a vector determined from a local derivative value of the color is corrected, and the corrected vector is used as an extracted-color displacement.

An extracted-color displacement setting unit 4 sets an extracted-color displacement from the direction of a local color displacement obtained from each region of interest and from the direction of a displacement of a given color. For example, local color displacements whose displacement directions are within a predetermined angular range with respect to the displacement of the given color may be selected from among the local color displacements obtained from the regions of interest, and an average value, a center value, a local maximum value, or the like may be determined as an estimated color displacement. The estimated color displacement may be set as an extracted-color displacement. In this case, the direction of the displacement of the given color may be corrected to the direction of the estimated color displacement, while the length may not necessarily be corrected.

An extracted-color displacement may also be set by determining a frequency distribution of the directions of the local color displacements obtained from the individual regions of interest and determining a direction indicating one of the local maximum values of frequency in the frequency distribution which is the closest to the direction of the displacement of the given color. The direction of the displacement of the given color may be corrected to the determined direction, and an extracted-color displacement may be set. The setting methods described above are merely illustrative, and an extracted-color displacement may be set using any other method.

The similarity calculation unit 2 may calculate a similarity using the extracted-color displacement set by the extracted-color displacement setting unit 4 based on a displacement of a given color. The extracted-color displacement has been corrected by the extracted-color displacement setting unit 4 in accordance with the given image. Thus, even if variations in color have occurred due to various factors, the similarity of a region where information is embedded may be larger than that obtained when the displacement of the given color is used as an extracted-color displacement without correction. This may ensure that information is more reliably detected and acquired.

The binarization unit 3 described in the first exemplary modification may be added to the configuration according to the second exemplary modification.

Figure 7:
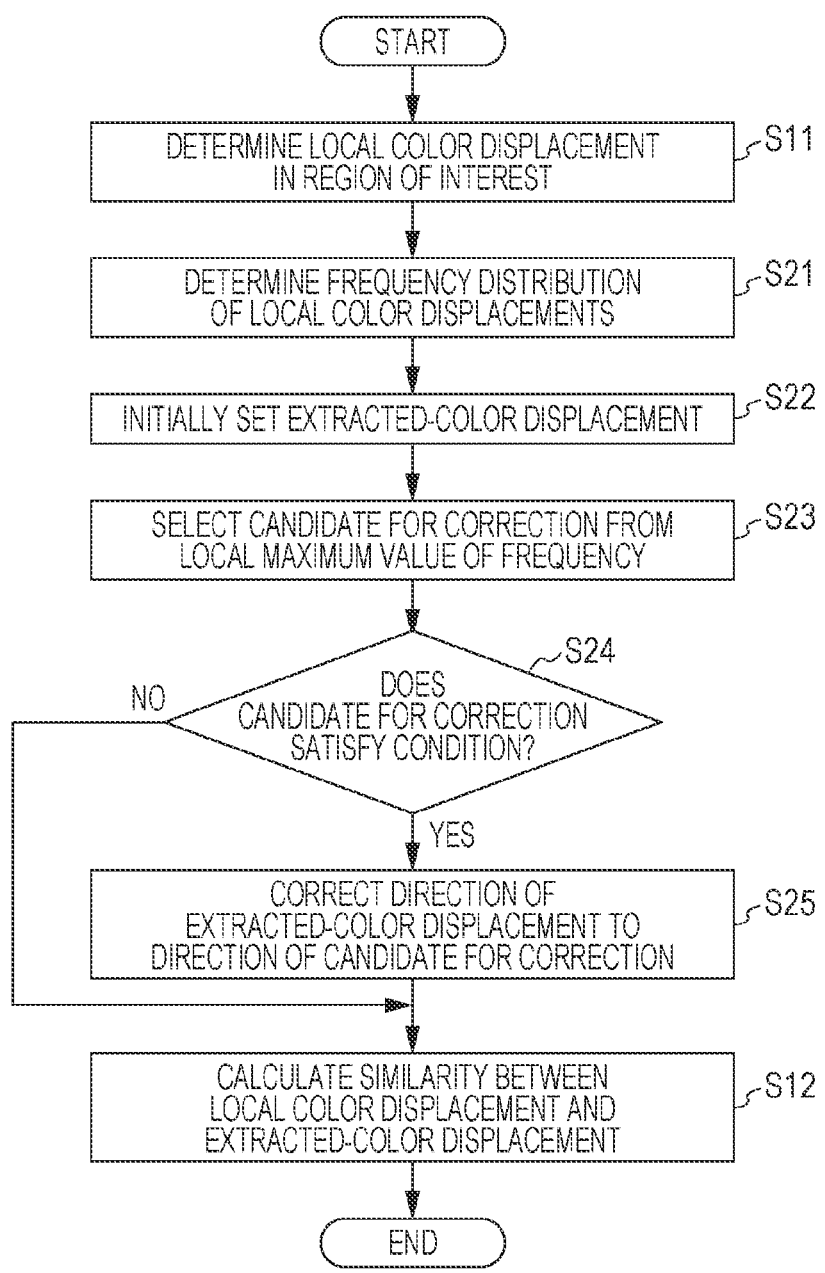
FIG. 7 is a flowchart illustrating an example of an operation according to the second exemplary modification of the first exemplary embodiment of the present invention.

FIG. 7 is a flowchart illustrating an example of an operation according to the second exemplary modification of the first exemplary embodiment of the present invention. In the illustrated example, an extracted-color displacement is set using a local maximum value in a frequency of directions of local color displacements. The processing of S11 and S12 is similar to that described above with reference to FIG. 4.

After the local color displacement extraction unit 1 determines a local color displacement in a region of interest in S11, then, in S21, the extracted-color displacement setting unit 4 determines a frequency distribution of directions of local color displacements from local color displacements in individual regions of interest determined in S11. In S22, the extracted-color displacement setting unit 4 sets a displacement of a given color as the initial extracted-color displacement.

In S23, the extracted-color displacement setting unit 4 determines a direction whose frequency exhibits a local maximum value from the frequency distribution determined in S21. The number of local maximum values is not always one, and plural local maximum values may be generated. When plural local maximum values are generated, the directions corresponding to the respective local maximum values are determined as candidates for correction. Among them, the correction candidate that is the closest to the direction of the displacement of the given color is selected.

In S24, it is determined whether or not the candidate for correction selected in S23 satisfies a certain condition. For example, one such condition may be that the direction of the candidate for correction is within a predetermined angular range from the direction of the displacement of the given color, and it may be determined whether or not this condition is satisfied. Note that conditions other than the condition described in this example may be used.

If it is determined in S24 that the condition is satisfied, then, in S25, the local color displacement extraction unit 1 corrects the set direction of the extracted-color displacement to the direction of the correction candidate selected in S23, and sets the corrected direction as an extracted-color displacement. If it is determined in S24 that the condition is not satisfied, the local color displacement extraction unit 1 does not correct the extracted-color displacement. In this case, the extracted-color displacement set in S22 is used as it is.

Using the extracted-color displacement set in the manner described above, the similarity calculation unit 2 may calculate a similarity between the local color displacement obtained by the local color displacement extraction unit 1 in S12 and the extracted-color displacement set by the extracted-color displacement setting unit 4.

If an extracted-color displacement is set using any other method, processing corresponding to the method used is performed.

Figure 8:
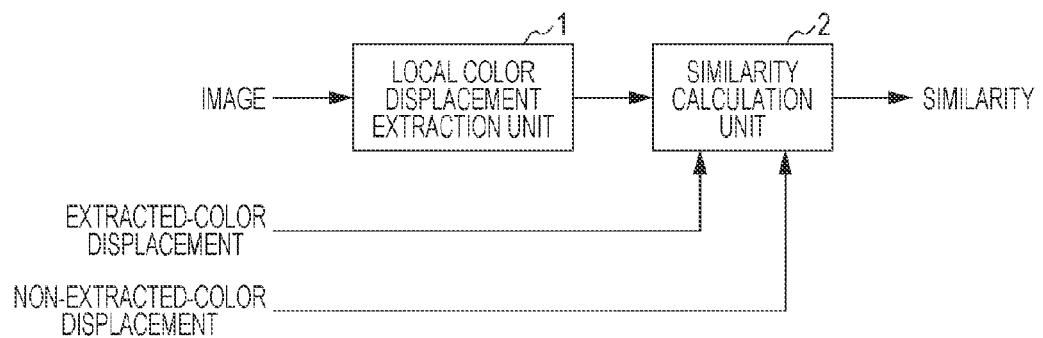
FIG. 8 is a block diagram illustrating a second exemplary embodiment of the present invention.

FIG. 8 is a block diagram illustrating a second exemplary embodiment of the present invention. In the second exemplary embodiment, the similarity calculation unit 2 calculates a similarity using an extracted-color displacement and a non-extracted-color displacement, by way of example. In contrast to an extracted-color displacement that is based on a color to be extracted with which information has been embedded, a non-extracted-color displacement is based on a color not to be extracted. For example, a vector of a color not to be extracted, a vector determined from a local derivative value of the color, or the like may be used as a non-extracted-color displacement. A region whose similarity to the extracted-color displacement is larger than any other region may not necessarily be a region where information is embedded. Thus, a non-extracted-color displacement set so that similarity based on a non-extracted-color displacement is reduced, compared to the case where information is not embedded in a region whose similarity base on the extracted-color displacement is large, is used. If an indistinguishable color is used as a color with which information is embedded, the color of dust, paper powder, and other imperceptible debris might be undesirably extracted as a color of embedded information. Such inconvenience may be addressed by setting a non-extracted-color displacement. To that end, a non-extracted-color displacement may be a color displacement similar to an extracted-color displacement but different from the extracted-color displacement by a predetermined range or more distant in the color space.

As in the first exemplary embodiment, a local color displacement extraction unit 1 extracts a local color displacement in a region of interest in a given image.

A similarity calculation unit 2 calculates a similarity between the local color displacement extracted by the local color displacement extraction unit 1 and a preset extracted-color displacement, and also calculates a similarity between the local color displacement and a non-extracted-color displacement that is a displacement of a color set in advance not to be extracted. The similarity calculation unit 2 further calculates an overall similarity from the similarity based on the extracted-color displacement and the similarity based on the non-extracted-color displacement, and uses the overall similarity as the similarity of the region of interest. The similarity between the extracted-color displacement and the local color displacement has been described in the first exemplary embodiment, and will not be described here.

As an example of the similarity between the non-extracted-color displacement and the local color displacement, when the non-extracted-color displacement is represented by a vector $V_x$, the local color displacement is represented by a vector V, and the angle defined by the vectors $V_x$ and V is represented by $\beta$, a similarity $F_x$ may be determined by $$F_x = |V|^m (\cos(\beta))^n,$$

where m and n are constants. The smaller the angle defined between the vectors $V_x$ and V, the larger the value the similarity $F_x$ takes. The larger the value of the similarity $F_x$, the less likely the extraction is to occur.

In addition, an overall similarity F is calculated from the similarity $F_y$ between the extracted-color displacement and the local color displacement and the similarity $F_x$ between the non-extracted-color displacement and the local color displacement. The overall similarity F increases as the value of the similarity $F_y$ between the extracted-color displacement and the local color displacement increases, and decreases as the value of the similarity $F_x$ between the non-extracted-color displacement and the local color displacement increases. As an example, the overall similarity F may be determined by subtracting the similarity $F_x$ from the similarity $F_y$ using $$F = s \cdot F_y - t \cdot F_x,$$

where s and t are constants. Alternatively, the overall similarity F may be determined by dividing the similarity $F_y$ by the similarity $F_x$ using $$F = F_y / F_x.$$

In addition, the overall similarity may be determined by taking the local color displacement into account. For example, the overall similarity may be controlled in accordance with the magnitude of the local color displacement. As an example, the overall similarity may be controlled so that the value of the overall similarity increases as the magnitude of the local color displacement decreases. Alternatively, the overall similarity may be controlled in accordance with the distance of the local color displacement from a straight line that overlaps the vector of the extracted-color displacement. As an example, the overall similarity may be controlled so that the value of the overall similarity increases as the distance of the local color displacement decreases. The control described above may be performed so that, as long as the value of the overall similarity increases, the similarity $F_x$ may be reduced relatively to the similarity $F_y$, or the similarity $F_y$ may be increased relatively to the similarity $F_x$. Alternatively, the angle $\alpha$, which is used to calculate the similarity $F_y$, may be decreased or the angle $\beta$, which is used to calculate the similarity $F_x$, may be increased. In an alternative example, a value for correcting the value of the overall similarity F in accordance with the size or distance of the local color displacement may be added to the overall similarity F. Any control method other than those in the examples described above may be used.

The overall similarity determination method described above is merely an example, and the overall similarity F may be determined using any of various other functions having the similarity $F_y$ and the similarity $F_x$ as coefficients. In this case, an overall similarity may be calculated by taking into account various factors other than the local color displacement. Alternatively, as described in the first exemplary embodiment, a similarity may be determined by determining the similarity in the opposite direction between each of the vectors of the extracted-color displacement and the non-extracted-color displacement and the vector of the local color displacement and selecting the larger one of the similarities in both directions in order to deal with the case where information is embedded with inversion (or subtraction) when embedded.

Figure 9:
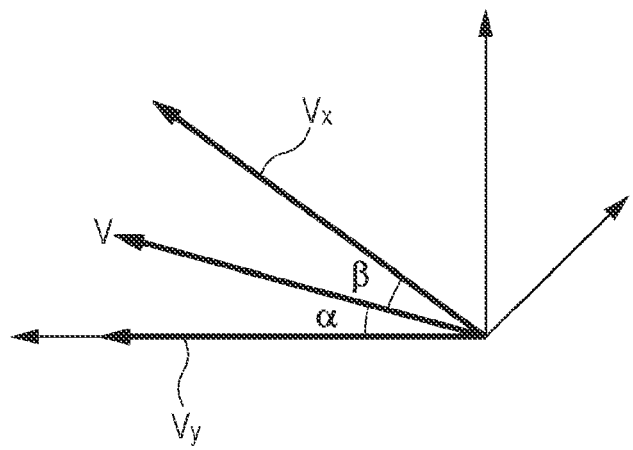
FIG. 9 illustrates an example of the relationship between local color displacement and each of extracted-color displacement and non-extracted-color displacement.

FIG. 9 illustrates an example of the relationship between the local color displacement and each of the extracted-color displacement and the non-extracted-color displacement. In FIG. 9, the vector V of the local color displacement, the vector $V_y$ of the extracted-color displacement, and the vector $V_x$ of the non-extracted-color displacement are illustrated in a certain color space where the vectors V, $V_y$, and $V_x$ start at the origin. In the example described above, the smaller the angle $\alpha$ defined between the vector $V_y$ of the extracted-color displacement and the vector V of the local color displacement, the larger the value the similarity $F_y$ takes. Further, the smaller the angle $\beta$ defined between the vector $V_x$ of the non-extracted-color displacement and the vector V of the local color displacement, the larger the value the similarity $F_x$ takes. The value of the overall similarity F increases as the value of the similarity $F_y$ increases, and decreases as the value of the similarity $F_x$ increases. Accordingly, the extraction may be more likely to occur as the vector V of the local color displacement approaches the vector $V_y$ of the extracted-color displacement, and may be less likely to occur as the vector V of the local color displacement approaches the vector $V_x$ of the non-extracted-color displacement. Thus, a color that may cause the noise component, which is similar to the color with which information has been embedded, is set as a non-extracted-color displacement to reduce the value of the overall similarity F of the color that may cause the noise component. Meanwhile, the value of the overall similarity F of a color that has been displaced due to the color with which information has been embedded is larger than any other value and may be developed.

Figure 10:
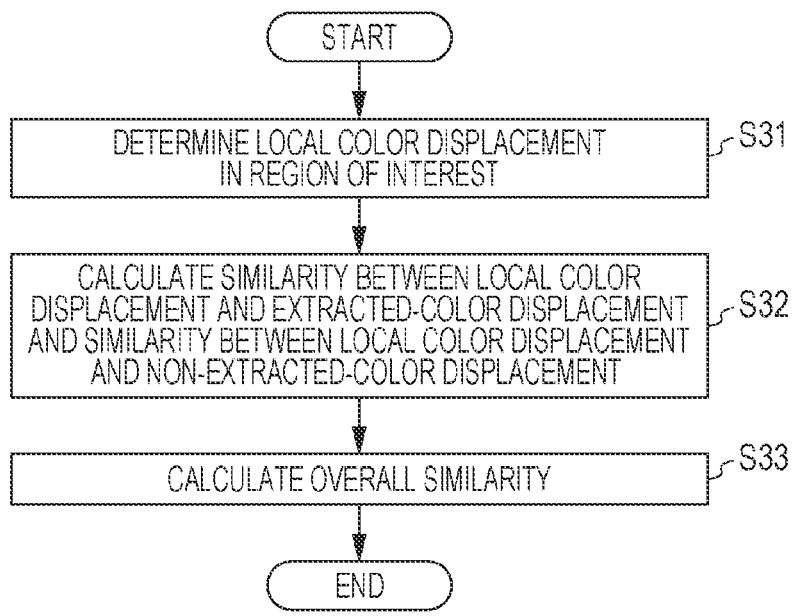
FIG. 10 is a flowchart illustrating an example of an operation according to the second exemplary embodiment of the present invention.

FIG. 10 is a flowchart illustrating an example of an operation according to the second exemplary embodiment of the present invention. In S31, the local color displacement extraction unit 1 determines a local color displacement from a local displacement of a color in a region of interest, such as a color difference vector between a local average value and a color in the region of interest or a local derivative value.

In S32, the similarity calculation unit 2 calculates a similarity between the local color displacement obtained by the local color displacement extraction unit 1 and a preset extracted-color displacement, and also calculates a similarity between the local color displacement and a preset non-extracted-color displacement.

In S33, the similarity calculation unit 2 further calculates an overall similarity from the similarity between the local color displacement and the extracted-color displacement and the similarity between the local color displacement and the non-extracted-color displacement, which are calculated in S32.

The overall similarity calculated by the similarity calculation unit 2 is output as a value of the region of interest. If a region of interest exists for which the overall similarity calculated by the similarity calculation unit 2 is greater than or equal to a preset threshold, it may be determined that the given image includes embedded information. Alternatively, a similarity image in which a value of similarity is assigned to each region of interest may be generated. In the similarity image, a larger value is assigned to a region where information is embedded, and, because of the setting of the nonextracted-color displacement, the similarity for the color displacement that may cause the noise component may be reduced. Thus, a similarity image having less noise than that in the configuration of the first exemplary embodiment described above may be obtained, and an image of the embedded information is reproduced. Once the position or shape of a portion of the image where a locally maximum value is obtained is specified, the position at which the information has been embedded may be determined, leading to the acquisition of the information. In addition, information embedded in a portion other than a white margin may also be detected and acquired. Furthermore, if variations in color have occurred due to various factors, the use of a value of similarity may ensure that information is detected and acquired.

Figure 11:
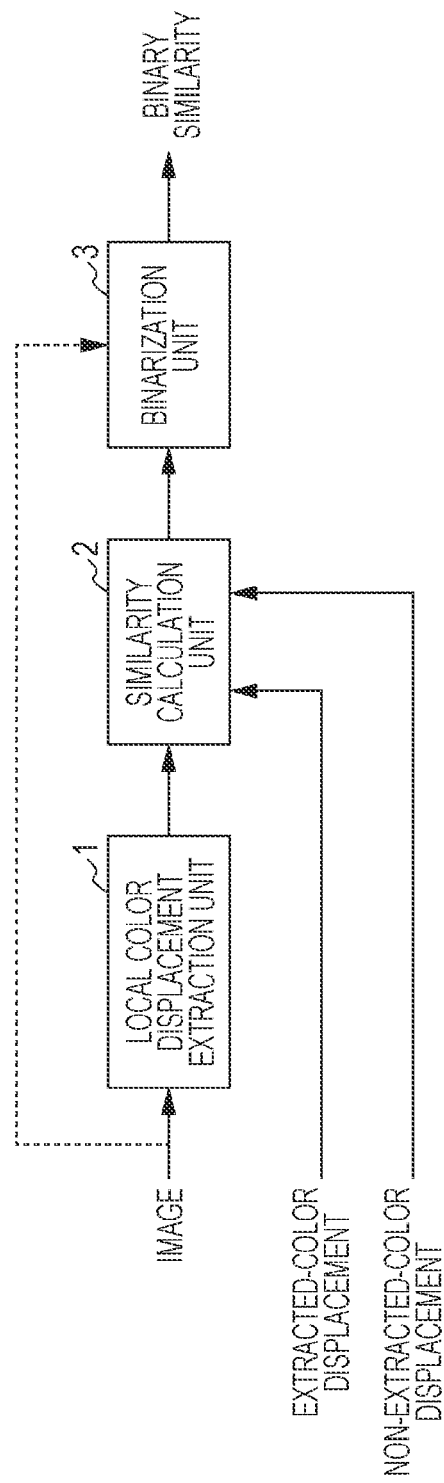
FIG. 11 is a block diagram illustrating a first exemplary modification of the second exemplary embodiment of the present invention.

FIG. 11 is a block diagram illustrating a first exemplary modification of the second exemplary embodiment of the present invention. The binarization unit 3 described above in the first exemplary modification of the first exemplary embodiment is further provided. The binarization unit 3 may also be provided in the second exemplary embodiment. The binarization unit 3 has been described previously, and will not be described here. In a binary image, a region where information is embedded may be explicitly identified.

Figure 12:
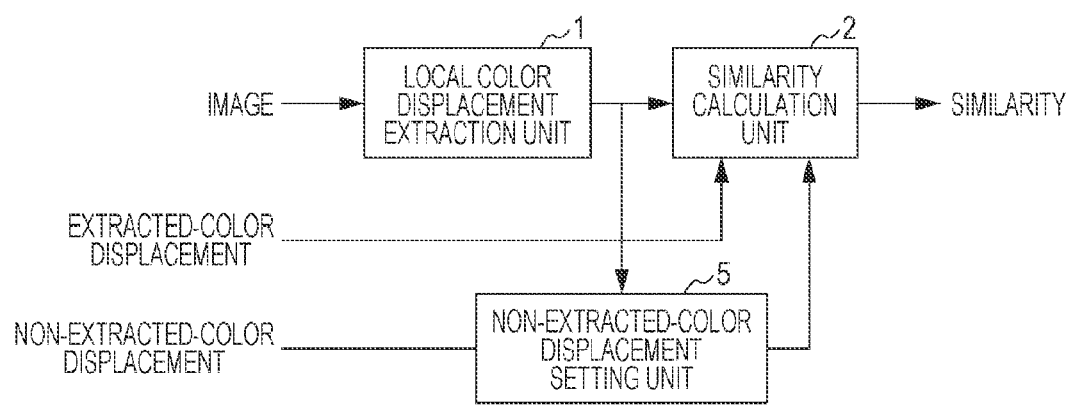
FIG. 12 is a block diagram illustrating a second exemplary modification of the second exemplary embodiment of the present invention.

FIG. 12 is a block diagram illustrating a second exemplary modification of the second exemplary embodiment of the present invention. In the second exemplary modification, by way of example, a non-extracted-color displacement, once set, is corrected and used.

A non-extracted-color displacement setting unit 5 sets a non-extracted-color displacement based on a local color displacement obtained from each region of interest and a given non-extracted-color displacement. For example, the non-extracted-color displacement setting unit 5 may collect the frequencies of occurrence of the local color displacements obtained from the individual regions of interest to determine a frequency distribution, and set a non-extracted-color displacement based on a local-maxima color displacement. As an example, the local-maxima color displacement having the largest frequency among local-maxima color displacements within a preset angular range from a given non-extracted-color displacement may be selected, and a non-extracted-color displacement may be set again from the selected local-maxima color displacement. Alternatively, a non-extracted-color displacement, once set, may be corrected to be close to the local-maxima color displacement, and a non-extracted-color displacement may be set again. In order to prevent the selection of a local-maxima color displacement based on the extracted-color displacement, local-maxima color displacements within a preset angular range from the extracted-color displacement may not be selected.

The similarity calculation unit 2 calculates a similarity using the set extracted-color displacement, and also calculates a similarity using the non-extracted-color displacement set by the non-extracted-color displacement setting unit 5. Then, the similarity calculation unit 2 may calculate an overall similarity from the similarity calculated using the extracted-color displacement and the similarity calculated using the non-extracted-color displacement. A non-extracted-color displacement is set in accordance with a given image. Thus, a non-extracted-color displacement may be set in accordance with the noise component included in the given image, and the noise component may be removed, or at least reduced.

The binarization unit 3 described in the first exemplary modification may be added to the configuration according to the second exemplary modification.

Figure 13:
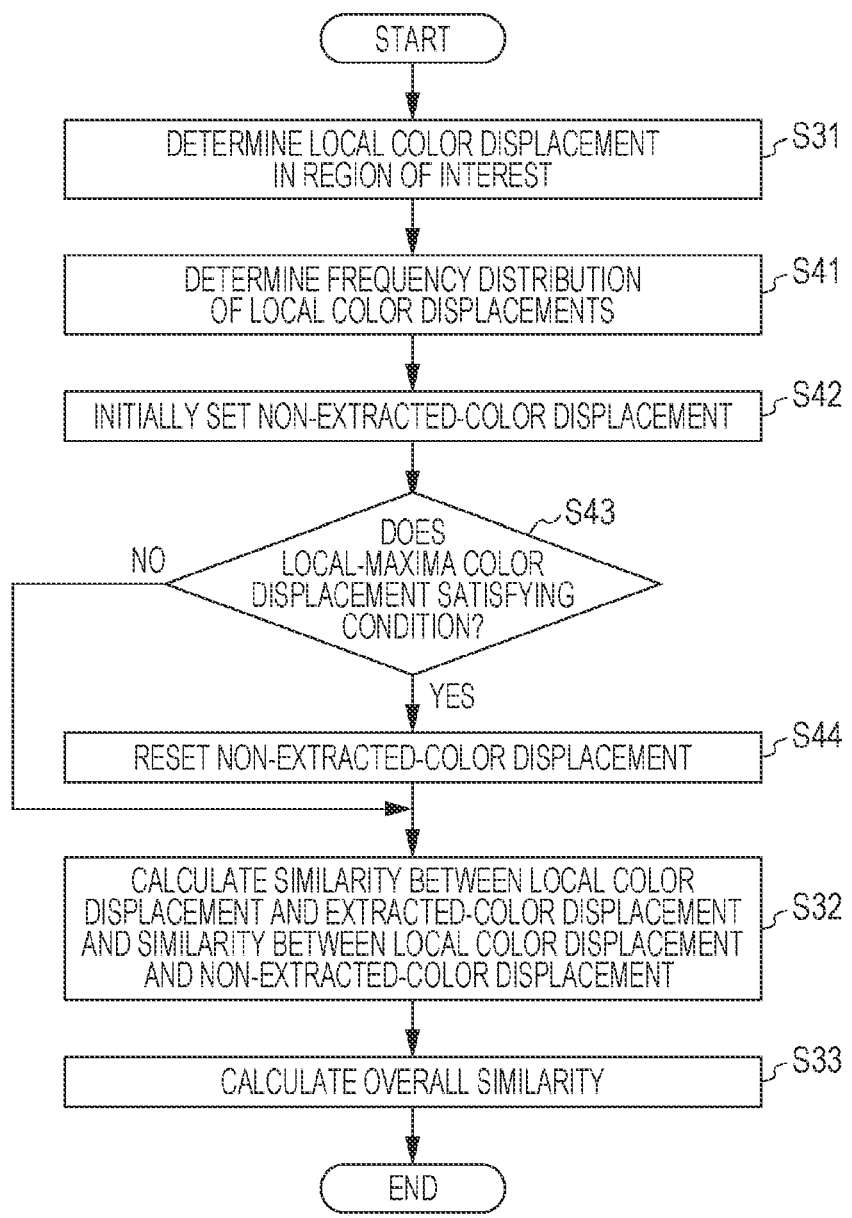
FIG. 13 is a flowchart illustrating an example of an operation according to the second exemplary modification of the second exemplary embodiment of the present invention.

FIG. 13 is a flowchart illustrating an example of an operation according to the second exemplary modification of the second exemplary embodiment of the present invention. The processing of S31, S32, and S33 is similar to that described above with reference to FIG. 10.

In S31, the local color displacement extraction unit 1 determines a local color displacement in a region of interest. Then, in S41, the non-extracted-color displacement setting unit 5 determines, from local color displacements of individual regions of interest determined in S31, a frequency distribution of the local color displacements. In S42, the non-extracted-color displacement setting unit 5 sets a given non-extracted-color displacement as the initial non-extracted-color displacement.

In S43, the non-extracted-color displacement setting unit 5 determines, from the frequency distribution determined in S41, whether or not a color displacement for which the frequency satisfying conditions has a local maximum value exists. Examples of the conditions may include a condition where the color displacement is within a preset angular range from a given non-extracted-color displacement, and a condition where the color displacement is outside a preset angular range from an extracted-color displacement. Such a condition may be determined in advance.

If it determined in S43 that the condition is satisfied, then in S44, the color displacement having the largest frequency among local-maxima color displacements satisfying the condition is selected, and is newly set as a non-extracted-color displacement. Alternatively, a given non-extracted-color displacement is corrected to be close to the selected color displacement, and a non-extracted-color displacement is set again. If it is determined in S43 that the condition is not satisfied, the non-extracted-color displacement is not corrected. In this case, the non-extracted-color displacement set in S42 is used as it is.

In S32, the similarity calculation unit 2 may calculate a similarity between the local color displacement obtained by the local color displacement extraction unit 1 and each of the extracted-color displacement and the non-extracted-color displacement set by the non-extracted-color displacement setting unit 5, by using the preset extracted-color displacement and the non-extracted-color displacement set in the manner described above. Then, in S33, the similarity calculation unit 2 may calculate an overall similarity.

Figure 14:
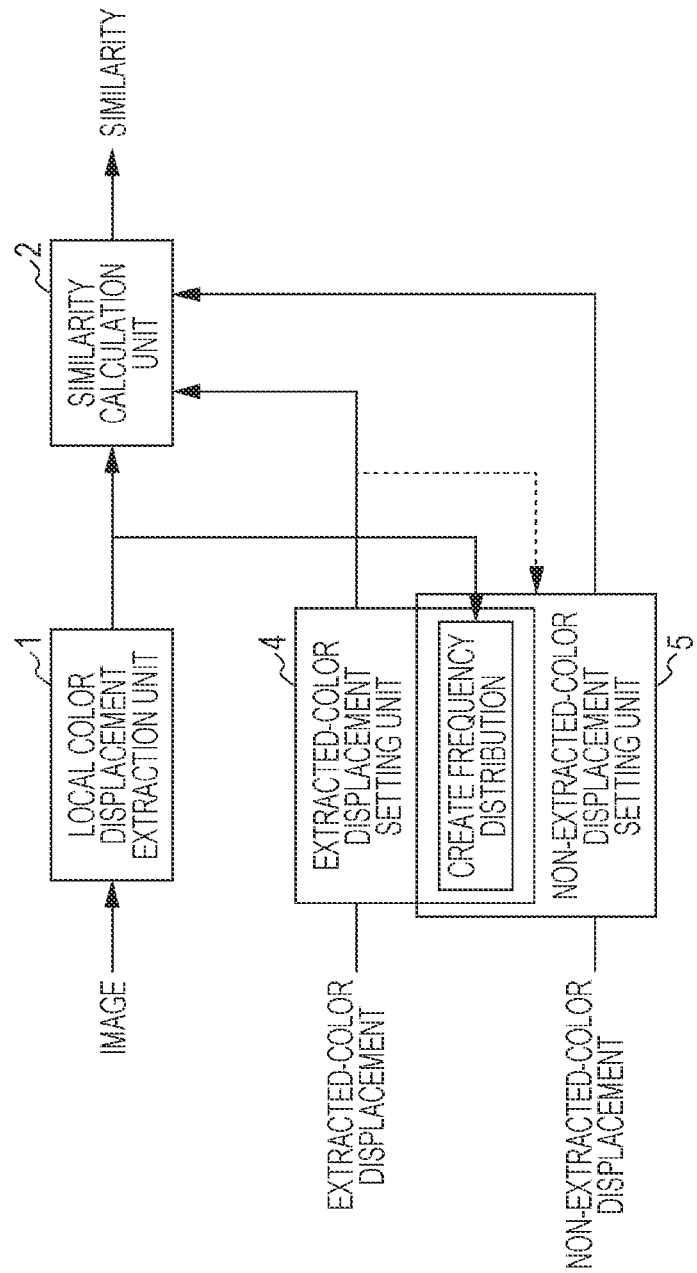
FIG. 14 is a block diagram illustrating a third exemplary modification of the second exemplary embodiment of the present invention.

FIG. 14 is a block diagram illustrating a third exemplary modification of the second exemplary embodiment of the present invention. In the third exemplary modification, the extracted-color displacement setting unit 4 described in the second exemplary modification of the first exemplary embodiment is further provided in the configuration of the second exemplary modification of the second exemplary embodiment described above. While the extracted-color displacement setting unit 4 and the non-extracted-color displacement setting unit 5 may be simply added, the extracted-color displacement setting unit 4 and the non-extracted-color displacement setting unit 5 may share a process for determining a frequency distribution of local color displacements because this process is commonly performed. In the configuration illustrated in FIG. 14, this process is shared, by way of example.

The extracted-color displacement setting unit 4 sets a given extracted-color displacement using a commonly determined frequency distribution of local color displacements. Further, the non-extracted-color displacement setting unit 5 sets a non-extracted-color displacement using the commonly determined frequency distribution of local color displacements. Then, the similarity calculation unit 2 calculates a similarity between the local color displacement and the extracted-color displacement and a similarity between the local color displacement and the non-extracted-color displacement using the extracted-color displacement set by the extracted-color displacement setting unit 4 and the non-extracted-color displacement set by the non-extracted-color displacement setting unit 5, and further calculates an overall similarity based on the calculated similarities.

The binarization unit 3 described in the first exemplary modification may be added to the configuration according to the third exemplary modification.

Figure 15:
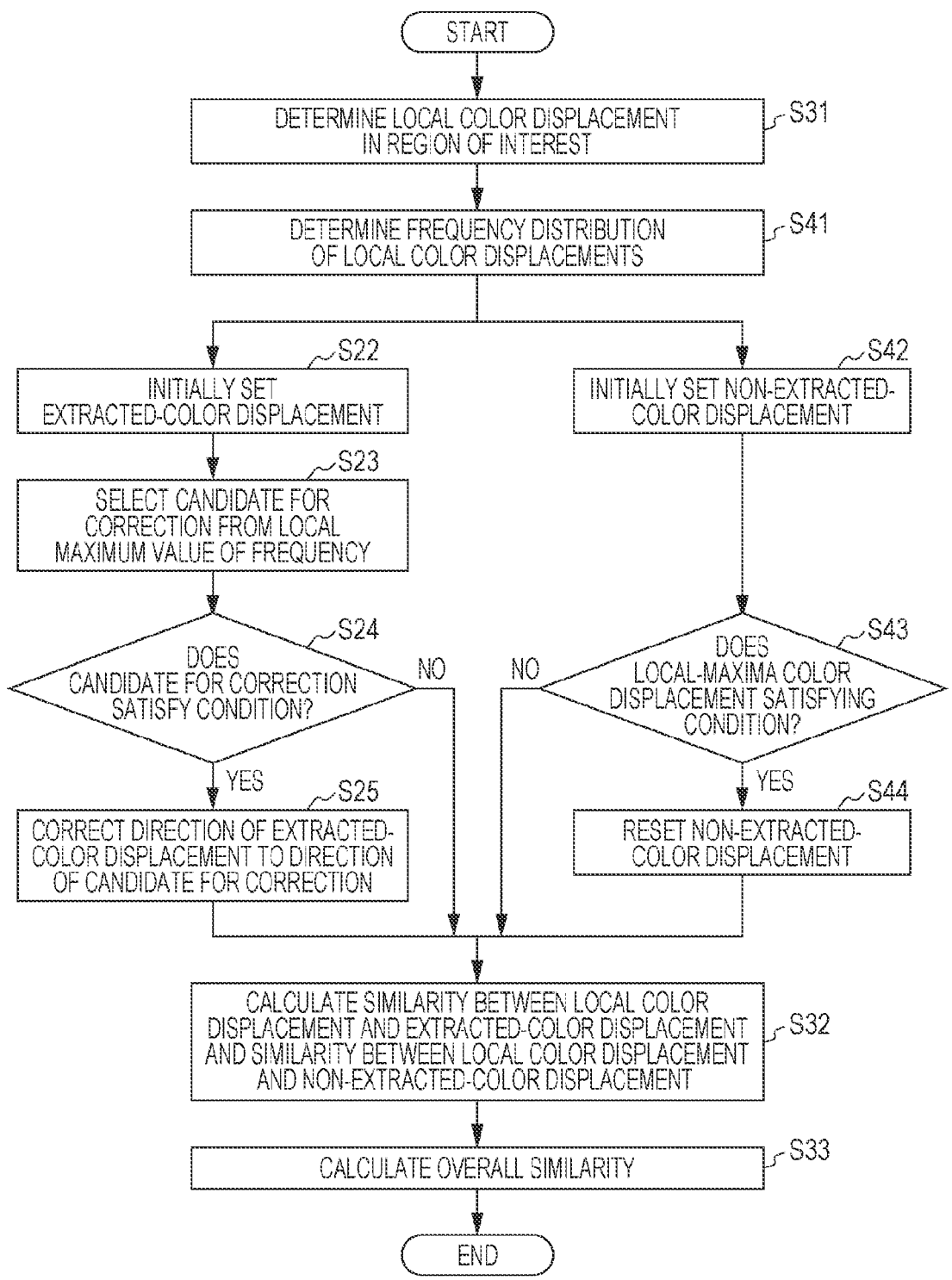
FIG. 15 is a flowchart illustrating an example of an operation according to the third exemplary modification of the second exemplary embodiment of the present invention.

FIG. 15 is a flowchart illustrating an example of an operation according to the third exemplary modification of the second exemplary embodiment of the present invention. In the illustrated example of the operation, the processing of S22, S23, S24, and S25 described above with reference to FIG. 7 according to the second exemplary modification of the first exemplary embodiment is added to the example of the operation illustrated with reference to FIG. 13. The details of the processing have been described, and an overview of the process flow will be described here.

In S31, the local color displacement extraction unit 1 determines a local color displacement in a region of interest. Then, in S41, the extracted-color displacement setting unit 4 and the non-extracted-color displacement setting unit 5 perform a common process to determine, from local color displacements of individual regions of interest determined in S31, a frequency distribution of the local color displacements.

In S22, the extracted-color displacement setting unit 4 sets a displacement of a given color as the initial extracted-color displacement. Then, in S23, the extracted-color displacement setting unit 4 determines a direction in which the frequency takes a local maximum value from the frequency distribution determined in S41, and selects the correction candidate that is the closest to the direction of the displacement of the given color as an extracted-color displacement among the determined direction. In S24, it is determined whether or not a certain condition, such as a condition where the correction candidate selected in S23 is within a predetermined angular range from the direction of the displacement of the given color, is satisfied. If the condition is satisfied, then, in S25, the extracted-color displacement setting unit 4 corrects the direction of the set extracted-color displacement to the direction of the correction candidate selected in S23, and sets the corrected direction as an extracted-color displacement. If it is determined in S24 that the condition is not satisfied, the extracted-color displacement setting unit 4 does not correct the extracted-color displacement, and the extracted-color displacement set in S22 is used as it is.

Further, in S42, the non-extracted-color displacement setting unit 5 sets a given non-extracted-color displacement as the initial non-extracted-color displacement. Then, in S43, the non-extracted-color displacement setting unit 5 determines, based on the frequency distribution determined in S41, whether or not a color displacement whose frequency has a local maximum value and that satisfies a condition such as a condition where the color displacement is within a preset angular range from the given non-extracted-color displacement exists. If it is determined in S43 that the condition is satisfied, then, in S44, the non-extracted-color displacement setting unit 5 selects the color displacement having the largest frequency among the local-maxima color displacements satisfying the condition, and sets a non-extracted-color displacement. If it is determined in S43 that the condition is not satisfied, the non-extracted-color displacement setting unit 5 does not correct the non-extracted-color displacement, and the non-extracted-color displacement set in S42 is used as it is.

In this manner, in S32, using the extracted-color displacement set in S22 or S25 and the non-extracted-color displacement set in S42 or S44, the similarity calculation unit 2 may calculate a similarity between the local color displacement and the extracted-color displacement and a similarity between the local color displacement and the non-extracted-color displacement. Then, in S33, the similarity calculation unit 2 may further calculate an overall similarity.

The processing of S22, S23, S24, and S25 and the processing of S42, S43, and S44 may be performed in parallel or one of them may be followed by the other. Furthermore, a condition relating to the extracted-color displacement, such as a condition where a color displacement that is within a preset angular range from an extracted-color displacement is not selected, may be added as the condition on which the determination is based in S43. In this case, the extracted-color displacement set in S22 or S25 may be used as the extracted-color displacement. In this case, the processing of S22, S23, S24, and S25 may be performed first and then the determination of S43 may be performed.

Figure 16:
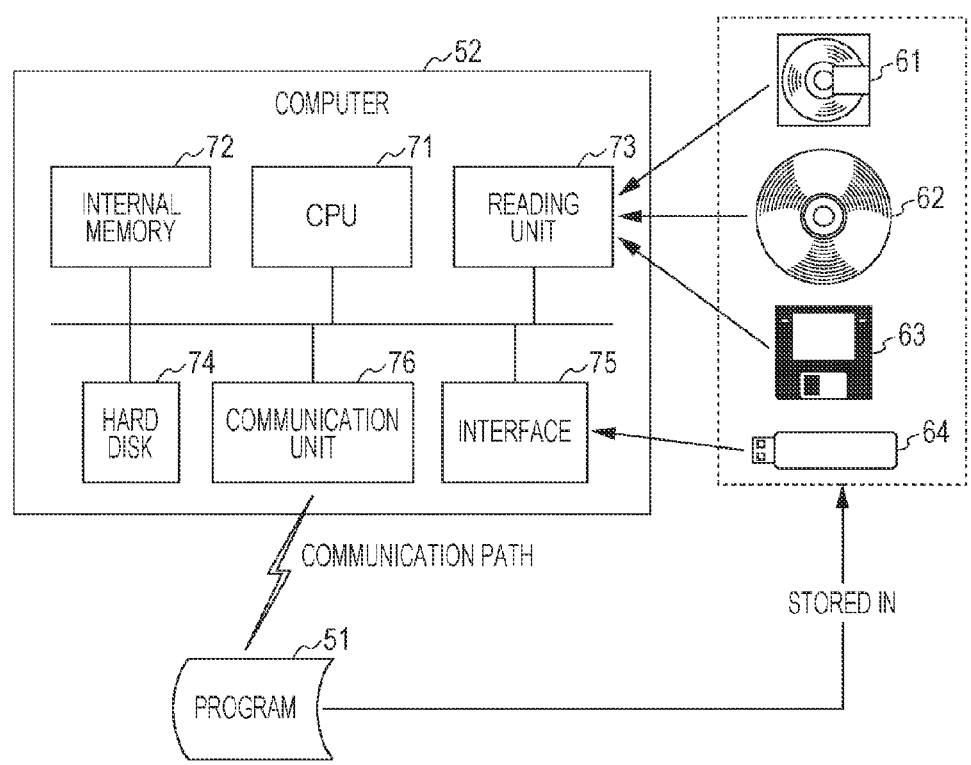
FIG. 16 illustrates an example of a computer program, an example of a storage medium storing the computer program, and an example of a computer when functions described in the exemplary embodiments of the present invention and the exemplary modifications thereof are implemented by the computer program.

FIG. 16 illustrates an example of a computer program, an example of a storage medium storing the computer program, and an example of a computer when functions described in the foregoing exemplary embodiments of the present invention and the exemplary modifications thereof are implemented by the computer program.

All or some of the functions of the units described in the foregoing exemplary embodiments of the present invention and the exemplary modifications thereof may be implemented by a computer-executable program 51. In this case, the program 51, data used with the program 51, and the like may be stored in a computer-readable storage medium. The term "storage medium" refers to a medium that causes a reading unit 73 included in a hardware resource of a computer 52 to change its state of energy such as magnetic, optical, or electrical energy in accordance with the description of a program and that transmits the description of the program to the reading unit 73 in the corresponding signal format. Examples of the storage medium may include a magneto-optical disk 61, an optical disk 62 (including a compact disc (CD), a digital versatile disc (DVD), and so forth), a magnetic disk 63, and a memory 64 (including an integrated circuit (IC) card, a memory card, a flash memory, and so forth). The storage medium is not limited to a portable one.

The program 51 is stored in the storage medium described above, and the storage medium is set in, for example, the reading unit 73 or an interface 75 of the computer 52 to read the program 51 by using the computer 52. The read program 51 is stored in an internal memory 72 or a hard disk 74 (including a magnetic disk, a silicon disk, and so forth). A central processing unit (CPU) 71 executes the program 51 to implement all or some of the functions described in the foregoing exemplary embodiments of the present invention and the exemplary modifications thereof. Alternatively, the program 51 may be transferred to the computer 52 via a communication path. The computer 52 may receive the program 51 through a communication unit 76 and store the program 51 in the internal memory 72 or the hard disk 74, and the CPU 71 may execute the program 51 to implement all or some of the functions described above.

A variety of devices may be connected to the computer 52 via the interface 75. For example, an image reading device may be connected via the interface 75, and an image read by the image reading device or an image produced by performing processing on the read image may be used as an image to be processed and may be subjected to the processes described in the foregoing exemplary embodiments of the present invention and the exemplary modifications thereof. A similarity or a similarity image that has been subjected to the processes may be passed to another program, may be stored in the hard disk 74 or a storage medium via the interface 75, or may be transferred to an external device via the communication unit 76.

Some of or all the elements may be implemented by hardware. Alternatively, the elements may be implemented together with other elements as a program including all or some of the functions described in the foregoing exemplary embodiments of the present invention and the exemplary modifications thereof. When the elements are used for any other application, the elements may be integrated into a program for the application.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an extraction unit that extracts a local color displacement, the local color displacement being a local displacement of color in a region of interest in a given image; and
   a calculation unit that calculates a similarity between the local color displacement and an extracted-color displacement, the extracted-color displacement being a displacement of a preset color.

2. The image processing apparatus according to claim 1, further comprising:
   an extracted-color displacement setting unit that sets the extracted-color displacement using a direction of a local color displacement obtained from each region of interest and using a direction of a displacement of a given color.

3. The image processing apparatus according to claim 2, wherein the calculation unit further calculates a similarity between the local color displacement and a non-extracted-color displacement, the non-extracted-color displacement being a displacement of a color set in advance not to be extracted, and calculates an overall similarity using the similarity between the local color displacement and the extracted-color displacement and the similarity between the local color displacement and the non-extracted-color displacement, the overall similarity being used as a similarity of the region of interest.

4. The image processing apparatus according to claim 3, further comprising:
   a non-extracted-color displacement setting unit that collects frequencies of occurrence of local color displacements obtained from regions of interest to determine a local-maxima color displacement and that sets the non-extracted-color displacement based on the local-maxima color displacement.

5. The image processing apparatus according to claim 3, further comprising:
   a binarization unit that binarizes the region of interest using the similarity between the local color displacement and the extracted-color displacement.

6. The image processing apparatus according to claim 5, wherein the binarization unit binarizes the similarity.

7. The image processing apparatus according to claim 5, wherein the binarization unit performs enhancement processing on the image in accordance with the similarity, and binarizes an image subjected to the enhancement processing.

8. The image processing apparatus according to claim 7, wherein the binarization unit performs enhancement processing on the image so that the larger the value the similarity has, the greater the effect the enhancement processing has, to enhance a region where information is embedded in the image.

9. The image processing apparatus according to claim 1, wherein the calculation unit further calculates a similarity between the local color displacement and a non-extracted-color displacement, the non-extracted-color displacement being a displacement of a color set in advance not to be extracted, and calculates an overall similarity using the similarity between the local color displacement and the extracted-color displacement and the similarity between the local color displacement and the non-extracted-color displacement, the overall similarity being used as a similarity of the region of interest.

10. The image processing apparatus according to claim 9, further comprising:
    a non-extracted-color displacement setting unit that collects frequencies of occurrence of local color displacements obtained from regions of interest to determine a local-maxima color displacement and that sets the non-extracted-color displacement based on the local-maxima color displacement.

11. The image processing apparatus according to claim 9, further comprising:
    a binarization unit that binarizes the region of interest using the similarity between the local color displacement and the extracted-color displacement.

12. The image processing apparatus according to claim 11, wherein the binarization unit binarizes the similarity.

13. The image processing apparatus according to claim 11, wherein the binarization unit performs enhancement processing on the image in accordance with the similarity, and binarizes an image subjected to the enhancement processing.

14. The image processing apparatus according to claim 13, wherein the binarization unit performs enhancement processing on the image so that the larger the value the similarity has, the greater the effect the enhancement processing has, to enhance a region where information is embedded in the image.

15. The image processing apparatus according to claim 1, further comprising:
    a binarization unit that binarizes the region of interest using the similarity between the local color displacement and the extracted-color displacement.

16. The image processing apparatus according to claim 15, wherein the binarization unit binarizes the similarity.

17. The image processing apparatus according to claim 15, wherein the binarization unit performs enhancement processing on the image in accordance with the similarity, and binarizes an image subjected to the enhancement processing.

18. The image processing apparatus according to claim 17, wherein the binarization unit performs enhancement processing on the image so that the larger the value the similarity has, the greater the effect the enhancement processing has, to enhance a region where information is embedded in the image.

19. A non-transitory computer readable medium storing a program causing a computer to execute a process for performing image processing, the process comprising:
- extracting a local color displacement, the local color displacement being a local displacement of color in a region of interest in a given image; and
- calculating a similarity between the local color displacement and an extracted-color displacement, the extracted-color displacement being a displacement of a preset color.

20. An image processing method comprising:
- extracting a local color displacement, the local color displacement being a local displacement of color in a region of interest in a given image; and
- calculating a similarity between the local color displacement and an extracted-color displacement, the extracted-color displacement being a displacement of a preset color.

* * * * *